UNITED STATES PATENT OFFICE.

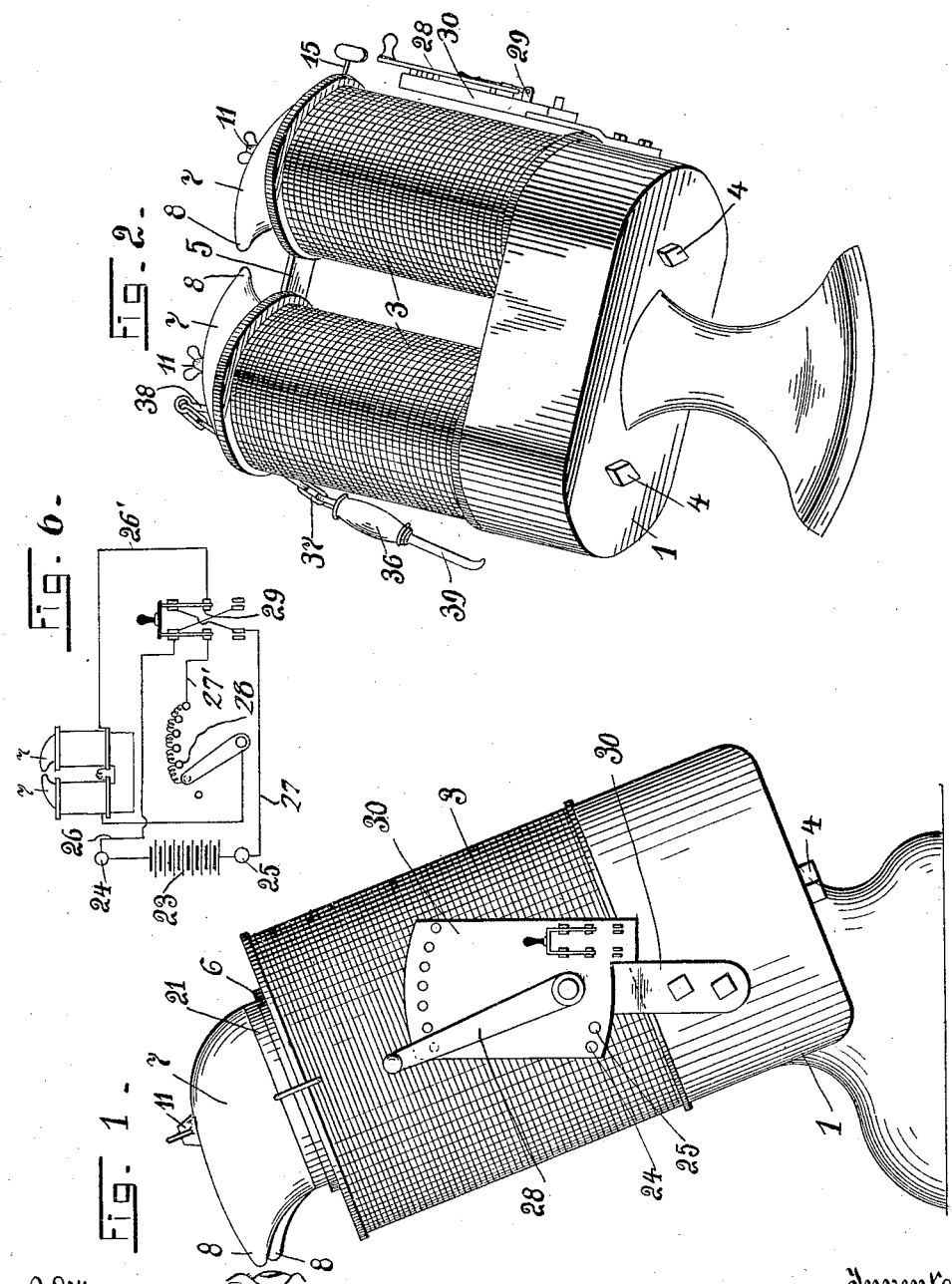

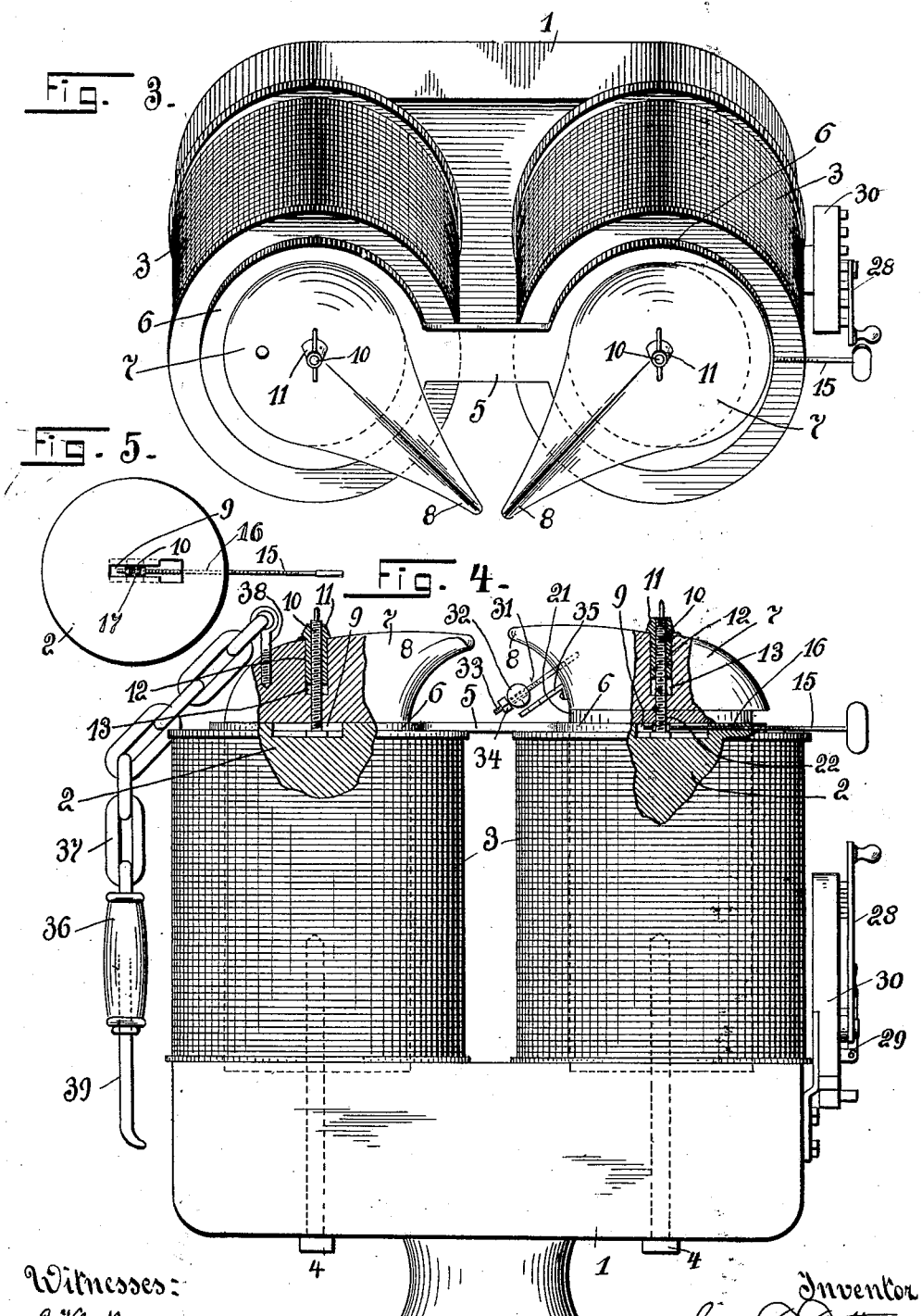

GEORGE T. FETTE, OF CINCINNATI, OHIO.

ELECTROMAGNET FOR SURGICAL PURPOSES.

1,033,883.  Specification of Letters Patent.  Patented July 30, 1912.

Application filed October 7, 1909. Serial No. 521,608.

*To all whom it may concern:*

Be it known that I, GEORGE T. FETTE, a citizen of the United States, residing at Cincinnati, in the county of Hamilton and State of Ohio, have invented certain new and useful Improvements in Electromagnets for Surgical Purposes, of which the following is a specification.

My invention relates to electro-magnets for surgical purposes and is especially applicable for detecting and extracting or aiding in extracting foreign bodies from the eye, although the same is also applicable for acting on foreign bodies in other relations.

My invention is best explained in connection with its application for detecting or extracting or aiding in extracting foreign substances from the eye, and is shown in such relation in the drawings, and the invention will be readily understood from the following description and claims, and from the drawings, in which latter:—

Figure 1 is a side elevation of my improved device, shown in connection with its application to an eye. Fig. 2 is a rear perspective view of my improved device. Fig. 3 is a top plan view of the same, with the hand-piece removed. Fig. 4 is a front elevation of my improved device looking in a direction at right angles to the axes of the cores and shown partly broken away for better illustration of the parts. Fig. 5 is a plan view of the upper end of one of the cores and showing the adjustment for the pole-piece thereon; and, Fig. 6 is a diagrammatic representation of the electric circuit.

The electro-magnet comprises a base 1 which forms a yoke between the cores 2 2 about which the windings 3 3 are received. The cores are shown attached to the base by screws 4. A bar 5 of non-magnetic material, as brass, having rings 6 received about the upper ends of the wound cores, preferably connects the outer ends of the wound cores and braces the same from each other.

7 7 represent the pole-pieces for the magnet, these pole-pieces being of bent form and gradually reducing in cross-section for forming tips 8 8 which are arranged to be placed in positions extending toward each other, the magnet, when the tips are so placed, forming a horse-shoe electro-magnet.

The pole-pieces are arranged for permitting adjustment for distance and also preferably elevation with relation to each other. For accomplishing this the pole-pieces are shown constructed separate from the cores of the magnet and preferably have swiveling and slidable connection therewith. Thus the upper end of each of the cores is shown provided with an undercut slot 9 for receiving the head of a bolt 10.

11 is a nut having a long threaded hub 12 arranged to be received over the bolt, the bolt and hub being received in aperture 13 in the pole-piece. If desired, but one of the pole-pieces may be made adjustable. Preferably one of the pole-pieces is provided with an adjusting screw 15 having a threaded bearing 16 in the upper end of the core and journaled but held against endwise movement in an aperture 17 in the bolt 10, the turning of the adjusting-screw shifting the bolt and pole-piece.

21 is a spacing-disk arranged to be placed between the core and the pole-piece for adjusting the tips of the pole-pieces to relative elevation, the bolt 10 being received through an aperture 22 in said spacing-disk. One or more of the spacing-disks may be employed for one or both of the poles of the magnet for elevating either tip above the other. By means of my improved device any desirable relative position of the tips may be obtained for producing the best results in the operation being performed. The electric energy may be supplied from any suitable source of electric energy, indicated at 23. The electro-magnet may be electrically connected with an ordinary incandescent lamp socket.

24 25 represent the magnet-terminals. Electric conductors 26 27 may connect these terminals with a reversing switch 29, electric conductors 26' 27' connecting the reversing switch with the magnet-windings. A rheostat 28 is preferably interposed in one of the electric conductors for the magnet for regulating the strength of current supplied thereto and for reversing the polarity of the tips, if this is desired in the course of the operation. The rheostat and switch are mounted on a bracket 30.

31 is an indicator for indicating the presence of electric current in the magnet and may be a ball 32 of magnetic material for instance of iron loosely slidable on a rod 33 of non-magnetic material, for instance brass, and adjustable to distance from the pole-piece by a nut 34 also of non-magnetic material. The ball may be adjusted with relation to the markings of a gage 35 of non-magnetic material for regulating the gap between the ball and pole-piece for indicating the presence of the desired strength of current. If the desired strength of current is not present, the ball will not be attracted to the pole-piece. Immediately upon absence of current the ball drops from the pole-piece.

36 is a hand-piece connected by a chain 37 with a bolt 38 releasably received in one of the pole-pieces 7, and 39 is a releasable instrument, such as a magnetic hand-bar, arranged to be magnetized by the magnetic flux passing through the core. Various instruments may be placed in the hand-piece.

The base, cores, pole-pieces, bolt 38, chain 37, hand-piece 36, and instrument 39 are made of metal which is readily magnetized by an electric current for forming a temporary magnet. Thus the base may be of cast-iron, the cores of soft wrought iron, the pole-pieces of cast steel, and the chain, hand-piece and releasable instrument of similar materials effecting a similar purpose. On the contrary, the nuts 11, adjusting screws 15, rod 33, nut 34 and gage 35 are preferably made of non-magnetic material, for instance brass. The electro-magnet is preferably of large size for effectually performing the functions for which it is intended and is arranged to exert a powerful magnetic force.

If it is desired to perform the operation of making a test for the presence of a foreign substance in the eye which is amenable to magnetic attraction, or to dislodge or to aid in dislodging such foreign substance from the eye, the patient is placed in easy position, for instance in sitting posture in front of the magnet, with the tips located approximate to the eye. The cores 2 2 are arranged inclined upon the base for enabling the tips 8 8 to be placed in forward position with relation to the body of the instrument for close approximation thereof to the eye of the patient. The outer ends of the pole tips and the upper forward ends of the wound cores when in normal positions are preferably located in substantially coincident vertical planes. The tips 8 8 are adjusted to position either close together or at desirable distance from each other and at desirable elevation with relation to each other for causing the magnetic flux to pass in such course with relation to the eye as to be most likely to have effect upon the foreign substance, which may be instanced as an iron splinter in the interior of the eye-ball. The strength of current may be regulated by the rheostat and if it is desired to change the course of the current this may be accomplished by the reversing switch.

With my improved device the splinter may be given a course of movement which will prevent injury to those parts of the eyeball which would result in permanent harm or difficult healing, and the splinter may be attracted from the remotest parts of the eye-ball, and dislodged if firmly embedded therein. When the splinter has assumed a position near the periphery of the eye-ball, the hand-instrument may be employed either for finally directing the course of the splinter or attracting the same in its removal, and when the hand-piece is employed the tips 8 8 are preferably separated for increasing the flux received by the hand-instrument.

My improved device is extremely serviceable and provides means whereby an extremely great range of power may be obtained for performing the operation and supplying just the power necessary for performing the same. A low or a very high voltage may be supplied to the pole-tips or the magnetic force may be regulated and directed by separating or causing approach between the tips, or adjusting the same to elevation.

Having thus fully described my invention, what I claim as new and desire to secure by Letters Patent is:

1. In an electro-magnet for surgical purposes of the character described, the combination of a U-shaped magnet comprising inclined wound cores and pole-pieces for said cores having tips thereon, and means for permitting adjustment of the distance between said tips, the inclination of said wound cores being such as to cause the outer ends of said tips and the forward upper ends of said wound cores to be normally located in coincident vertical planes, and a magnetic indicator on one of said pole-pieces, substantially as described.

2. In an electro-magnet for surgical purposes of the character described, the combination of a U-shaped magnet comprising inclined wound cores and pole-pieces for said cores having tips thereon, a hand-magnet-piece releasably secured to one of said pole-pieces, and means for permitting adjustment of the distance between said tips, the inclination of said wound cores being such as to cause the outer ends of said tips and the forward upper ends of said wound cores to be normally located in coincident vertical planes, substantially as described.

3. In combination, an electro-magnet for surgical purposes of the character described, comprising connected cores, electric windings for said cores, pole-pieces, a spacing disk releasably received between one of said pole-pieces and cores, and means for permitting relative adjustment between said pole-pieces, and constructed and arranged for adjusting the distance and height between said pole-pieces, substantially as described.

4. In combination, an electro-magnet for surgical purposes of the character described, comprising a pair of connected cores and electric windings therefor, of pole-pieces for said cores, means for permitting side-wise and swiveling adjustment of said pole-pieces on said cores, said pole-pieces being provided with pole-tips and means for relatively adjusting said pole-tips with relation to height, and constructed and arranged for permitting adjustment of lateral distance and elevation between said pole-tips, substantially as described.

5. In combination, an electro-magnet for surgical purposes of the character described comprising a pair of connected cores and windings therefor, a pole-piece for each of said cores provided with a pole-tip, one of said pole-pieces having slidable connection with its said core, said core having an under-cut slot at its upper end, and a headed bolt received in said slot for clamping said pole-piece to said core, and constructed for adjusting the distance between said pole-tips, substantially as described.

6. In combination, an electro-magnet for surgical purposes of the character described comprising a pair of connected cores and windings therefor, a pole-piece for each of said cores provided with a pole-tip, a magnetic hand-piece having flexible magnetic connection with one of said pole-pieces, one of said pole-pieces having slidable connection with said core, said core having an undercut slot at its upper end, and a headed bolt received in said slot for clamping said pole-piece to said core, and constructed for adjusting the distance between said pole-tips, substantially as described.

7. In combination, an electro-magnet for surgical purposes of the character described, comprising a pair of connected cores and electric windings therefor, a pole-piece for each of said cores having swiveling and sliding connection therewith, a magnetic indicator on one of said pole-pieces, a magnetic hand-piece, and a flexible magnetic connection between said hand-piece and one of said pole-pieces, substantially as described.

8. In an electro-magnet for surgical purposes of the character described, the combination of a pair of cores magnetically connected at one end thereof, electric windings for said cores, pole-pieces at the other end of said cores having tips thereon, and means for permitting adjustment of distance between said tips laterally with relation to each other and longitudinally with relation to said cores, substantially as described.

In testimony whereof, I have signed my name hereto in the presence of two subscribing witnesses.

GEORGE T. FETTE.

Witnesses:
LILLIAN BURNETT,
JOHN R. SCHINDEL.

---

Copies of this patent may be obtained for five cents each, by addressing the "Commissioner of Patents, Washington, D. C."